United States Patent
Kim et al.

(10) Patent No.: US 12,281,234 B2
(45) Date of Patent: Apr. 22, 2025

(54) AQUEOUS DISPERSION COATING MATERIAL AND COATING METHOD THEREOF

(71) Applicant: LG ELECTRONICS INC., Seoul (KR)

(72) Inventors: Jihyun Kim, Seoul (KR); Sanghyun Hong, Seoul (KR); Seojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 952 days.

(21) Appl. No.: 17/049,930

(22) PCT Filed: May 2, 2019

(86) PCT No.: PCT/KR2019/005267
§ 371 (c)(1),
(2) Date: Oct. 22, 2020

(87) PCT Pub. No.: WO2019/216598
PCT Pub. Date: Nov. 14, 2019

(65) Prior Publication Data
US 2021/0238440 A1 Aug. 5, 2021

Related U.S. Application Data

(60) Provisional application No. 62/668,267, filed on May 8, 2018.

(30) Foreign Application Priority Data

Jul. 31, 2018 (KR) .................. 10-2018-0089401

(51) Int. Cl.
*C09D 133/08* (2006.01)
*C08K 3/11* (2018.01)
*C08K 3/22* (2006.01)

(52) U.S. Cl.
CPC .............. *C09D 133/08* (2013.01); *C08K 3/11* (2018.01); *C08K 3/22* (2013.01); *C08K 2003/2255* (2013.01); *C08K 2003/2296* (2013.01)

(58) Field of Classification Search
None
See application file for complete search history.

(56) References Cited

U.S. PATENT DOCUMENTS

2005/0026444 A1* 2/2005 Babu .................. C09G 1/02
438/697

FOREIGN PATENT DOCUMENTS

| CN | 103409002 A | * 11/2013 |
| CN | 107418349 A | 12/2017 |

(Continued)

OTHER PUBLICATIONS

CN-107556852 Translation.*
Computer-generated English-language translation of CN-103409002-A.*

*Primary Examiner* — Vu A Nguyen
(74) *Attorney, Agent, or Firm* — Bryan Cave Leighton Paisner LLP (57) ABSTRACT

The present invention relates to a water soluble coating material comprising: a solubilizer containing an acrylic polymer or a glycol-based polymer; and molybdenum-containing inorganic particles, wherein the content of the inorganic particles is in the range of 7.5 to 50 parts by weight per 100 parts by weight of the polymer contained in the solubilizer.

4 Claims, 4 Drawing Sheets

(56) References Cited

FOREIGN PATENT DOCUMENTS

| | | |
|---|---|---|
| CN | 107556852 A | 1/2018 |
| EP | 3082415 A1 | 10/2016 |
| JP | 5786494 B2 | 9/2015 |
| JP | 2015189793 A | 11/2015 |
| KR | 10-1492652 B1 | 2/2015 |
| KR | 10-2016-0071548 A | 6/2016 |
| KR | 10-1793659 B1 | 11/2017 |

* cited by examiner

AQUEOUS DISPERSION COATING MATERIAL AND COATING METHOD THEREOF

CROSS-REFERENCE TO RELATED APPLICATIONS

This application is the National Stage filing under 35 U.S.C. 371 of International Application No. PCT/KR2019/005267, filed on May 2, 2019, which claims the benefit of earlier filing date and right of priority to U.S. Provisional application No. 62/668,267, filed on May 8, 2018 and Korean Application No. 10-2018-0089401, filed on Jul. 31, 2018, the contents of which are all hereby incorporated by reference herein in their entirety.

TECHNICAL FIELD

The present disclosure relates to a water soluble coating material and a coating method thereof, and more particularly, to a water soluble coating material formed to prevent a generation of odor-causing substances, and a coating method thereof.

BACKGROUND ART

Microorganisms such as bacteria and fungi exist throughout life. Particularly, bacteria and fungi may actively grow on a surface exposed to a high moisture environment. Accordingly, a substance that causes an unpleasant odor is generated as bacteria and fungi grow on the surface.

To solve this problem, the growth of bacteria and fungi can be prevented by immediately removing moisture. However, there can be many difficulties in creating an environment from which moisture is removed. For example, it may be difficult to remove moisture such as condensate formed on a surface of a heat exchanger generated by an operation of the heat exchanger, which is a key component of an air conditioner, refrigerator, and clothes dryer. In addition, there are also surfaces that are difficult to avoid moisture environments, such as washing machines that are constantly exposed to moisture.

Accordingly, in order to remove an unpleasant odor generated by bacteria and fungi, a masking technique is used to hide the unpleasant odor by adding fragrant substances. However, adding scents requires continuous input of scented substances, and since how individuals feel toward scented substances are subjective, effects that can be obtained through the masking technique are limited. In addition, the masking technique has a disadvantage in that it cannot fundamentally remove unpleasant odors.

Therefore, when a coating containing a transition metal oxide is applied to a base material, antibacterial and catalytic properties can be imparted to the base material. Since the transition metal oxide quickly oxidizes a surface of the basic material when meeting moisture in the atmosphere, it has antibacterial properties that inhibit a growth of bacteria and destroy bacteria. In addition, the transition metal oxide has a catalytic property of adsorbing and oxidizing some odorous substances to change them into odorless compounds.

When the transition metal oxide is used to impart antibacterial and catalytic properties to the base material, the transition metal oxide must be in a form of particles having a relatively large surface area in order to maintain properties of a material such as a polymer forming a coating layer. Microparticles with a size of several micrometers to hundreds of nanometers can be an example.

In the prior document, European Patent Publication No. 3,082,415 A1 (published on Oct. 26, 2016), as an example of a transition metal oxide, a composite material formed of molybdenum-containing inorganic compounds was applied to a surface of a product to inhibit growth of bacteria and fungi. In other words, generation of unpleasant odors due to bacteria and fungi has been inhibited by the antibacterial effect of a composite material formed of a molybdenum-containing inorganic compound.

However, as disclosed in the prior document, since a water solubility of the molybdenum-containing inorganic compounds is very low, there is a limit to a water soluble coating containing the inorganic compound. That is, the related art molybdenum-containing inorganic compounds having antibacterial properties were present in a form of a turbid fluid or a dispersion fluid in which the molybdenum-containing inorganic compounds are dispersed in a water soluble coating material. Thus, the coating material containing the inorganic compounds has a problem in that precipitation occurs over time. Therefore, in the present disclosure, a water soluble coating material containing the inorganic compounds while maintaining uniformly dispersed state of the inorganic compounds over time and a coating method thereof are provided.

DETAILED DESCRIPTION OF THE DISCLOSURE

Technical Problem

An aspect of the present disclosure is to propose a water soluble coating material capable of forming a coating layer having antibacterial or antifungal properties.

Another aspect of the present disclosure is to propose a water soluble coating material in which inorganic compounds are uniformly dispersed.

In addition, the present disclosure is to propose a coating method of a water soluble coating material.

In addition, the present disclosure is to propose a coating layer formed by a coating method of a water soluble coating material.

Technical Solution

The water soluble coating material of the present disclosure capable of forming a coating layer having antibacterial or antifungal properties may be disclosed as a water soluble coating material with improved miscibility of molybdenum-containing inorganic particles, including a solubilizer containing an acrylic polymer or a glycol-based polymer.

In detail, the molybdenum-containing inorganic particles contained in the water soluble coating material of the present disclosure may react with moisture. By the reaction, an acidic substance or active oxygen may be formed. Accordingly, the water soluble coating material may form a coating layer capable of reducing odors caused by bacteria or fungi, and having antibacterial or antifungal properties.

The water soluble coating material according to the present disclosure may include a solubilizer containing an acrylic polymer or a glycol-based polymer, and molybdenum-containing inorganic particles, wherein a content of the inorganic particles may be in a range of 7.5 to 50 parts by weight per 100 parts by weight of the polymer contained in the solubilizer. The inorganic particles may be a material having antibacterial or antifungal properties.

In an embodiment, the inorganic particles may contain zinc molybdate ($ZnMoO_4$) or molybdenum trioxide ($MoO_3$).

In an embodiment, the water soluble coating material may further contain water.

In an embodiment, the water soluble coating material may further contain a hydrophilic film-forming solution.

In an embodiment, the hydrophilic film-forming solution may contain a hydrophilic polymer, and the hydrophilic polymer may contain at least one selected from a group consisting of polyvinyl alcohol, polyoxyethylene glycol, polysulfonic acid, polyacrylic acid, polymethacrylic acid, and polypropylene glycol.

In addition, a coating method of the present disclosure includes forming a first solution by dissolving a solubilizer containing an acrylic polymer or a glycol-based polymer in water, forming a second solution by mixing molybdenum-containing inorganic particles in the first solution and stirring the mixture to form the second solution where the inorganic particles are dissolved therein, forming a third solution by mixing a hydrophilic film-forming solution in the second solution, and forming a coating layer by applying the third solution to a base material and drying at a predetermined temperature, wherein the inorganic particles are precipitated in the forming the coating layer.

In an embodiment, in the forming the first solution, a content of the polymer contained in the first solution may be in a range of 4 to 12 parts by weight per 100 parts by weight of water.

In an embodiment, in the forming the second solution, a content of the inorganic particles may be in a range of 7.5 to 50 parts by weight per 100 parts by weight of the polymer contained in the first solution.

In an embodiment, the inorganic particles in the forming the second solution may contain zinc molybdate ($ZnMoO_4$) or molybdenum trioxide ($MoO_3$).

In an embodiment, in the forming the third solution, the hydrophilic film-forming solution may contain a hydrophilic polymer, and the hydrophilic polymer may contain at least one selected from a group consisting of polyvinyl alcohol, polyoxyethylene glycol, polysulfonic acid, polyacrylic acid, polymethacrylic acid, and polypropylene glycol.

In an embodiment, the forming the coating layer may further include forming a hydrophilic layer having a hydrophilic functional group on a surface of the base material, and the third solution may be applied to the hydrophilic layer on the base material.

In an embodiment, in the forming the coating layer, the predetermined temperature may be in a range of 100 to 230° C.

In an embodiment, the forming the coating layer may be performed for a predetermined time, and the predetermined time may be in a range of 5 to 10 minutes.

In addition, the present disclosure relates to a coating layer, and may include molybdenum-containing inorganic particles formed by the above coating method.

Advantageous Effects

According to the water soluble coating material according to the present disclosure, molybdenum-containing inorganic particles are contained in the coating layer formed of the water soluble coating material, and moisture is supplied to the inorganic particles to form acidic substances or active oxygen. Accordingly, a coating layer capable of reducing odor and having antibacterial or antifungal properties can be formed.

In addition, since the water soluble coating material according to the present disclosure contains molybdenum-containing inorganic particles and a solubilizer containing an acrylic polymer or a glycol-based polymer and thereby having improved miscibility, the water soluble coating material maintains uniformly dispersed state over time and has improved long-term storage stability.

In addition, since a separate low-temperature cooling is excluded from a process of forming a coating layer containing molybdenum-containing inorganic particles by mixing the water soluble coating material according to the present disclosure in water, applying it to a base material on which the coating layer is to be formed, and drying it at a predetermined temperature, the coating layer can be formed easily.

In addition, the coating layer formed by the coating method of the present disclosure has an effect of improving a drainage property of the coating layer by forming molybdenum-containing inorganic particles on the surface thereof.

MODES FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The present disclosure relates to a water soluble coating material to prevent a generation of odor-causing substances.

In an embodiment of the present disclosure, the water soluble coating material may include a solubilizer containing an acrylic polymer or a glycol-based polymer. In addition, the water soluble coating material may include molybdenum-containing inorganic particles.

The solubilizer may be mixed in the inorganic particles to improve miscibility in an aqueous solution. That is, the inorganic particles may form a uniform liquid phase in the aqueous solution by the acrylic polymer or glycol-based polymer of the solubilizer.

In addition, the inorganic particles may contain zinc molybdate ($ZnMoO_4$) or molybdenum trioxide ($MoO_3$). The inorganic particles are substances that react with moisture to form active oxygen to reduce odor and exhibit antibacterial or antifungal properties. Accordingly, the inorganic particles may inhibit a generation of bacteria and fungi in an environment rich in moisture, thereby suppressing a generation of substances that cause odors, such as nitrogen compounds generated by metabolism of bacteria and fungi.

In one embodiment, a content of the inorganic particles may be in a range of 7.5 to 50 parts by weight per 100 parts by weight of the polymer contained in the solubilizer. Specifically, when the content of the inorganic particles is less than 7.5 parts by weight per 100 parts by weight of the polymer contained in the solubilizer, the coating layer formed of the coating material cannot exhibit sufficient antibacterial or antifungal properties due to the low concentration of the inorganic particles.

On the other hand, when the content of the inorganic particles exceeds 50 parts by weight per 100 parts by weight of the polymer in the solubilizer, miscibility of the inorganic particles may decrease in the water soluble coating material containing the inorganic particles. Accordingly, the inorganic particles are incompletely mixed and phase-separated over time, thereby forming a precipitate.

In one embodiment, when the inorganic particles contain zinc molybdate ($ZnMoO_4$), Synthro® PON W 578 (SYNTHRON), which is an acrylic polymer-containing solubilizer, may be used as a solubilizer. Accordingly, the inorganic particles including zinc molybdate ($ZnMoO_4$) may exhibit sufficient miscibility in an aqueous solution.

In one embodiment, when molybdenum trioxide ($MoO_3$) is contained in the inorganic particles of the water soluble coating material, the solubilizer may contain polyethylene glycol in the glycol-based polymer. Accordingly, the inorganic particles including molybdenum trioxide ($MoO_3$) may exhibit sufficient miscibility in an aqueous solution.

In addition, the water soluble coating material of the present disclosure may be formed in an appropriate concentration to form a coating layer by further containing water. In addition, the water soluble coating material may further contain a commercialized hydrophilic film-forming solution. The hydrophilic film-forming solution contains a hydrophilic polymer. Specifically, the hydrophilic polymer may contain at least one selected from a group consisting of polyvinyl alcohol, polyoxyethylene glycol, polysulfonic acid, polyacrylic acid, polymethacrylic acid, and polypropylene glycol.

Therefore, when the hydrophilic film-forming solution is added to the water soluble coating material of the present disclosure to form the inorganic particles together with the hydrophilic polymer on the base material, water bound to the hydrophilic polymer may be supplied to the inorganic particles. That is, the inorganic particles react with water supplied by the hydrophilic polymer to form active oxygen to decompose malodorous substances, thereby reducing malodor. In addition, antibacterial or antifungal properties of the coating layer formed of the water soluble coating material may be further improved by the reaction.

Figure 1:
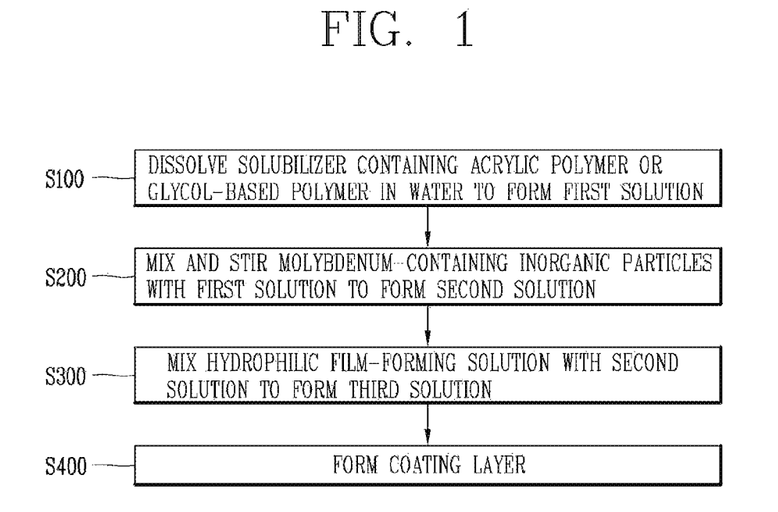
FIG. 1 is a view illustrating a sequence of a coating method for forming a coating layer with a water soluble coating material of the present disclosure.

FIG. 1 is a view illustrating a sequence of a coating method for forming the coating layer with the water soluble coating material of the present disclosure.

Referring to FIG. 1, the coating method disclosed in the present disclosure may include forming a first solution [S100], forming a second solution [S200], forming a third solution [S300], and forming a coating layer [S400].

In detail, in the forming the first solution [S100], the first solution is formed by dissolving a solubilizer containing an acrylic polymer or a glycol-based polymer in water. A content of the polymer contained in the first solution may be sufficient in mixing the molybdenum-containing inorganic particles to be described later.

Thus, the content of the polymer contained in the first solution may preferably be in a range of 4 to 12 parts by weight per 100 parts by weight of water. When the content of the polymer is less than 4 parts by weight per 100 parts by weight of water, the inorganic particles to be described later cannot be sufficiently mixed in the aqueous solution. In addition, when the content of the polymer exceeds 12 parts by weight per 100 parts by weight of water, a problem may occur in forming a coating layer to be described later. Specifically, when the content of the polymer increases, a concentration of the hydrophilic polymer contained in the hydrophilic film-forming solution that is contained in the third solution to be described later and that constitutes a main component of the coating layer is lowered. Therefore, the coating layer evenly containing the hydrophilic polymer cannot be formed on the surface of the base material.

In the forming the second solution [S200], molybdenum-containing inorganic particles are mixed in the first solution and stirred to form the second solution. The content of the inorganic particles may be formed in a range of 7.5 to 50 parts by weight per 100 parts by weight of the polymer contained in the first solution. When the content of the inorganic particles is less than 7.5 parts by weight, the coating layer formed of the coating material cannot exhibit sufficient antibacterial or antifungal properties due to the low concentration of the inorganic particles. On the other hand, when the content of the inorganic particles exceeds 50 parts by weight per 100 parts by weight of the polymer in the solubilizer, the miscibility of the inorganic particles may decrease in the second solution containing the inorganic particles. Accordingly, the inorganic particles are incompletely mixed and phase-separated over time, thereby forming a precipitate.

In one embodiment, the inorganic particles in the forming the second solution may contain zinc molybdate ($ZnMoO_4$) or molybdenum trioxide ($MoO_3$).

In one embodiment, when the inorganic particles contain zinc molybdate ($ZnMoO_4$), Synthro® PON W 578 (SYNTHRON), which is an acrylic polymer-containing solubilizer, may be used as a solubilizer. Accordingly, the inorganic particles including zinc molybdate ($ZnMoO_4$) may exhibit sufficient miscibility in an aqueous solution.

In one embodiment, when molybdenum trioxide ($MoO_3$) is contained in the inorganic particles of the water soluble coating material, the solubilizer may contain polyethylene glycol in the glycol-based polymer. Accordingly, the inorganic particles including molybdenum trioxide (MoO3) may exhibit sufficient miscibility in the aqueous solution.

In the forming the third solution [S300], the third solution is formed by mixing the hydrophilic film-forming solution in the second solution. The hydrophilic film-forming solution may be a film-forming solution configured to form a commercialized hydrophilic polymer film. Specifically, the hydrophilic film-forming solution may contain a hydrophilic polymer, and the hydrophilic polymer may contain at least one selected from a group consisting of polyvinyl alcohol, polyoxyethylene glycol, polysulfonic acid, polyacrylic acid, polymethacrylic acid, and polypropylene glycol.

In the forming the coating layer [S400], the third solution may be applied to the surface of the base material on which the coating layer is to be formed and dried at a predetermined temperature to form the coating layer including inorganic particles. In the process of drying at the predetermined temperature, the inorganic particles may be precipitated to be formed in the coating layer. In the process of applying the third solution, any method of applying a liquid to the surface of the base material such as dip coating, spin coating, roll coating, and spray coating can be used.

Meanwhile, the predetermined temperature may be in a range of 100 to 230° C. When the predetermined temperature is below 100° C., a time duration required to form the coating layer may be lengthened, and the inorganic particles cannot be precipitated into crystals having a size suitable for the coating layer. In addition, when the predetermined temperature exceeds 230° C., the acrylic polymer, glycol-based polymer, and hydrophilic polymer are denatured due to deterioration, thereby inhibiting a coating layer from being formed.

In addition, an appropriate time duration for forming a coating layer in the predetermined temperature range may preferably be a range of 5 to 10 minutes. In the forming the coating layer [S400], since a separate low-temperature cooling is excluded from the process of forming the coating layer containing molybdenum-containing inorganic particles by drying it at the predetermined temperature, the coating layer can be formed easily.

In addition, the forming the coating layer [S400] may further include forming a hydrophilic layer having a hydrophilic functional group on a surface of the base material. In one embodiment, the hydrophilic layer may be formed of aluminum oxide by oxidizing or etching a surface of a base material formed of aluminum. In addition, the hydrophilic layer may be formed by applying a polymer having hydrophilicity.

For example, the hydrophilic layer may include a hydrophilic functional group such as a hydroxy group (—OH) on the surface. Accordingly, adhesion between the hydrophilic functional group of the hydrophilic layer and the hydrophilic polymer contained in the coating layer of the present disclosure may be improved. In addition, the hydrophilic layer may be formed by an etching process. By the etching process, a hydrophilic layer having a specific shape may be formed on the surface of the base material. Accordingly, the hydrophilic layer may have an increased surface area due to the specific shape, thereby improving adhesion to the coating layer of the present disclosure.

For example, the water soluble coating material may include (1) dissolving 100-300 g of acrylic polymer in 1 kg of water, and adding 10-20 g of inorganic particles ZnMoO$_4$; and (2) mixing 1 kg of hydrophilic polymer with 0.5~1.5 g of water and solution (1).

Hereinafter, examples of the water soluble coating material of the present disclosure will be described.

Figure 2:
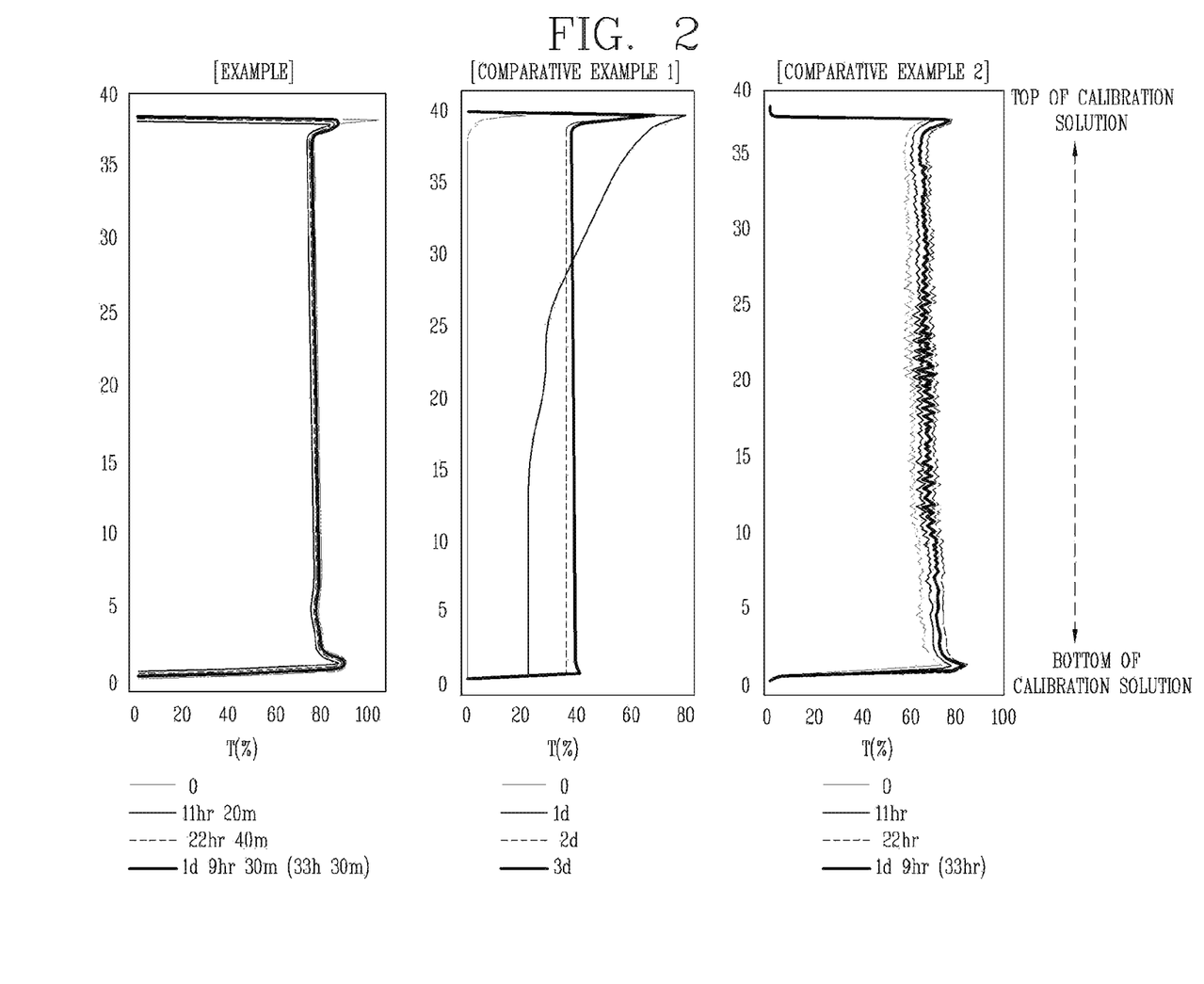
FIGS. 2 and 3 are images for comparing dispersion stability properties in an example and comparative examples of the present disclosure.
Figure 3:
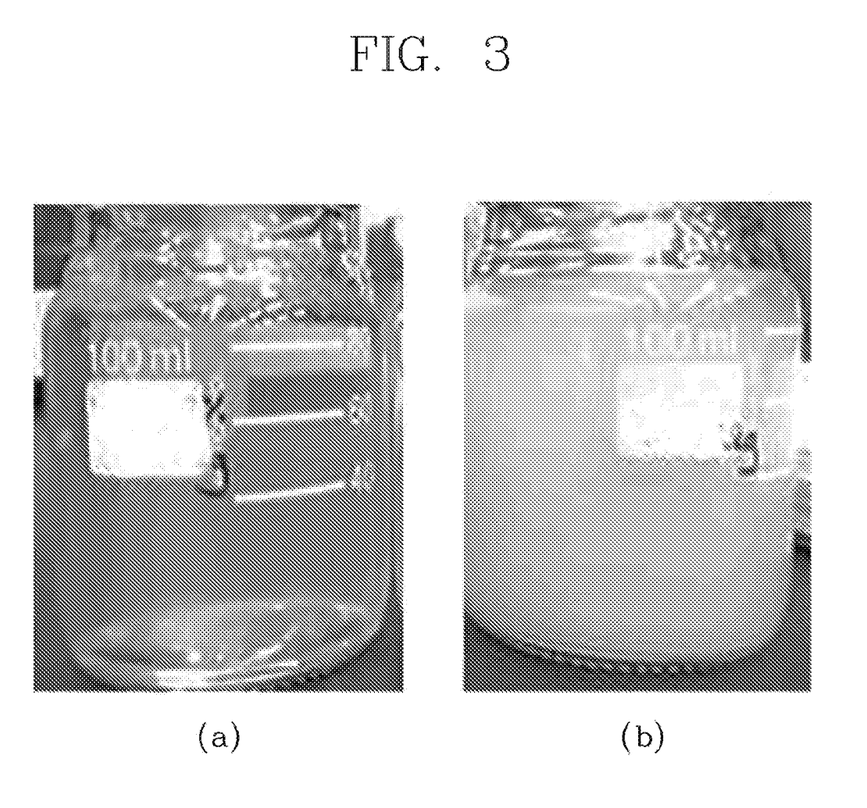

FIGS. 2 and 3 are images for comparing dispersion stability properties in an example and comparative examples of the present disclosure.

Example: Formation of Water Soluble Coating Material

A water soluble coating material is formed according to the above description, and particularly, the water soluble coating material may be formed according to the forming the first solution [S100], the forming the second solution [S200], and the forming the third solution [S300] in the coating method of the water soluble coating material described in FIG. 1. Specifically, the water soluble coating material of the example includes inorganic particles, a solubilizer, and a hydrophilic film-forming solution. In addition, zinc molybdate (ZnMoO4) is contained as the inorganic particles, and Synthro® PON W 578 (SYNTHRON), an acrylic polymer-containing solubilizer, is contained as a solubilizer.

Comparative Example 1

A coating material of the comparative example 1 is a solution containing inorganic particles in a hydrophilic film-forming solution. In detail, the solution of the comparative example 1 is formed in a manner same as in the above-described example, excluding the solubilizer of the water soluble coating material of the example.

Comparative Example 2

A coating material of the comparative example 2 is a hydrophilic film-forming solution in which the solubilizer and the inorganic particles are excluded from the water soluble coating material of the example.

Referring to FIG. 2, dispersion stability is measured using Turbiscan® LAB (Formulaction Co., France). In detail, the graph of FIG. 2 shows dispersion stabilities of the coating materials of the example, the comparative example 1, and the comparative example 2, respectively. In a case of the example, it can be seen that the dispersion is stably maintained while having a high transmittance regardless of the time.

On the other hand, in the comparative example 1, it is found that the dispersion state of the inorganic particles is not maintained and a precipitate is formed immediately. In addition, in the comparative example 2, result values indicating dispersion stability fluctuate, but a change such as particle settling is not observed.

That is, it can be seen that the change in dispersion stability in which precipitation occurs in the comparative example 1 is caused by inorganic particles. In addition, it can be seen that the miscibility of the inorganic particles is improved by including the solubilizer.

That is, since the water soluble coating material in the example contains molybdenum-containing inorganic particles and a solubilizer containing the acrylic polymer or glycol-based polymer and thereby having improved miscibility, the water soluble coating material maintains uniformly dispersed state over time and has improved long-term storage stability.

FIG. 3 shows images of states in which the water soluble coating materials of the example and the comparative example 1 are observed with the naked eye. In detail, (a) of FIG. 3 shows the example, and (b) shows the comparative example 1. Referring to FIG. 3, since the inorganic particles in the coating material of the example have sufficient miscibility as in the result of the dispersion stability of FIG. 2, the coating material appears as a transparent solution in which the inorganic particles are evenly dispersed. On the other hand, it can be seen that the coating material of the comparative example 1 is inferior in miscibility of inorganic particles and is thus formed opaquely as a turbid fluid.

Figure 4:
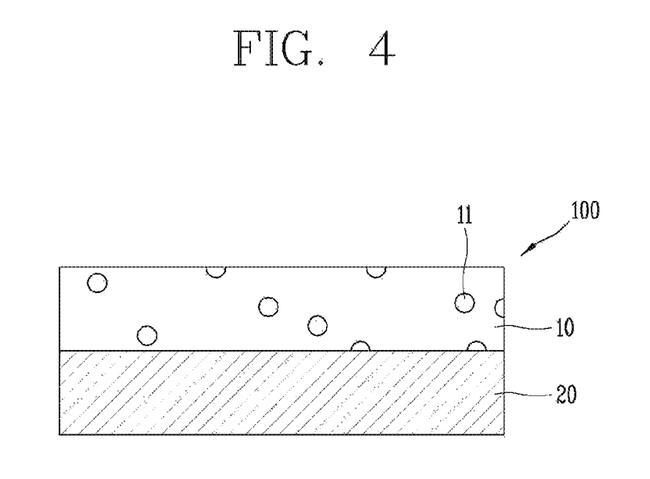
FIG. 4 is a view illustrating a coating layer formed by a coating method of a water soluble coating material of the present disclosure.

FIG. 4 is a view illustrating a coating layer 100 formed by the coating method of the water soluble coating material of the present disclosure.

Referring to FIG. 4, the coating layer 100 of the present disclosure may exist in a form of being laminated on a surface of a base material 20. The base material 20 may be a variety of products formed from an injection product.

The coating layer 100 may include a hydrophilic polymer layer 10 and inorganic particles 11 distributed or dispersed in the hydrophilic polymer layer 10. The inorganic particles 11 are precipitated on the hydrophilic polymer layer 10 and exist in a form of a filler, and may be located either inside or on a surface of the hydrophilic polymer layer 10.

In addition, the precipitated inorganic particles 11 need to be maintained without losing material properties such as hydrophilic polymers while imparting antibacterial, antifungal and catalytic properties to the base material. Accordingly, average particles of the inorganic particles 11 may have a size of several hundreds of nanometers and may stably exist so as to be evenly dispersed in the coating layer 100.

Therefore, since the inorganic particles 11 are in a particle form having a relatively large surface area, the inorganic particles 11 may easily have antibacterial and antifungal properties that quickly oxidize a surface of the coating layer 100 when meeting moisture in the atmosphere or inhibit or destroy a growth of bacteria or fungi by generating active oxygen. That is, since the coating layer 100 has antibacterial and antifungal properties, it can prevent a generation of substances that cause an unpleasant odor due to reproduction of bacteria and fungi.

Further, the average particles of the inorganic particles 11 have a size of several hundreds of nanometers so that appropriate amount of moisture can be adhered to the surface of the coating layer 100. Accordingly, the drainage property of the coating layer 100 may be improved.

In addition, a hydrophilic layer may further be stacked on the basic material 20 by further including a step of forming a hydrophilic layer (not shown) having a hydrophilic functional group on the surface of the base material 20 in the forming the coating layer [S400] as described in the description of FIG. 1.

Figure 5:
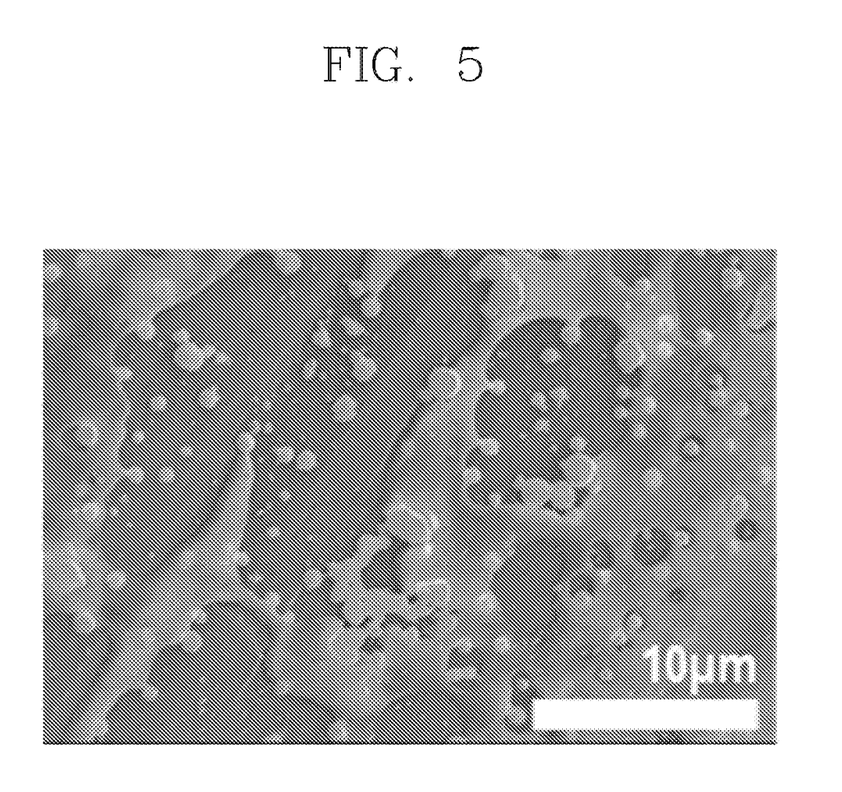
FIG. 5 is an electron microscope image of a coating layer formed by a coating method of a water soluble coating material of the present disclosure.

FIG. 5 is an electron microscope image of a coating layer formed by the coating method of the water soluble coating material of the present disclosure.

Referring to FIG. 5, it can be seen that spherical inorganic particles are evenly dispersed in the coating layer.

It will be apparent to those skilled in the art that the water soluble coating material and the coating method thereof described above are not limited to the configuration and method of the above-described embodiments, but may be embodied in other specific forms without departing from essential features of the present disclosure.

Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An aqueous dispersion coating material, comprising:
a first water;
a solubilizer containing an acrylic polymer and dissolved in the first water;
molybdenum-containing inorganic particles; and
a hydrophilic film-forming solution,
wherein a content of the inorganic particles is in a range of 7.5 to 50 parts by weight per 100 parts by weight of the polymer contained in the solubilizer,
wherein the hydrophilic film-forming solution contains a hydrophilic polymer, and
wherein a second water bound to the hydrophilic polymer is supplied to the inorganic particles, and the inorganic particles react with the second water supplied by the hydrophilic polymer to form active oxygen to decompose malodorous substances,
wherein the inorganic particles contain zinc molybdate ($ZnMoO_4$), and
wherein a content of the polymer contained in the solubilizer is in a range of 4 to 12 parts by weight per 100 parts by weight of the first water.

2. The aqueous dispersion coating material of claim 1, wherein the hydrophilic polymer contains at least one selected from a group consisting of polyvinyl alcohol, polyoxyethylene glycol, polysulfonic acid, polyacrylic acid, polymethacrylic acid, and polypropylene glycol.

3. The aqueous dispersion coating material of claim 1, wherein parts by weight of the hydrophilic polymer are relatively equal to parts by weight of the first water.

4. A solution for mixing with a hydrophilic film-forming solution forming an aqueous dispersion coating material, comprising:
a solubilizer containing an acrylic polymer; and
molybdenum-containing inorganic particles for forming active oxygen to decompose malodorous substances,
wherein a content of the inorganic particles is in a range of 7.5 to 50 parts by weight per 100 parts by weight of the polymer contained in the solubilizer,
wherein the inorganic particles contain zinc molybdate ($ZnMoO_4$), and
wherein a content of the polymer contained in the solubilizer is in a range of 4 to 12 parts by weight per 100 parts by weight of water.

* * * * *